March 3, 1931.  I. E. COLVIN ET AL  1,794,670
PROCESSING APPARATUS
Filed March 17, 1926   6 Sheets-Sheet 4
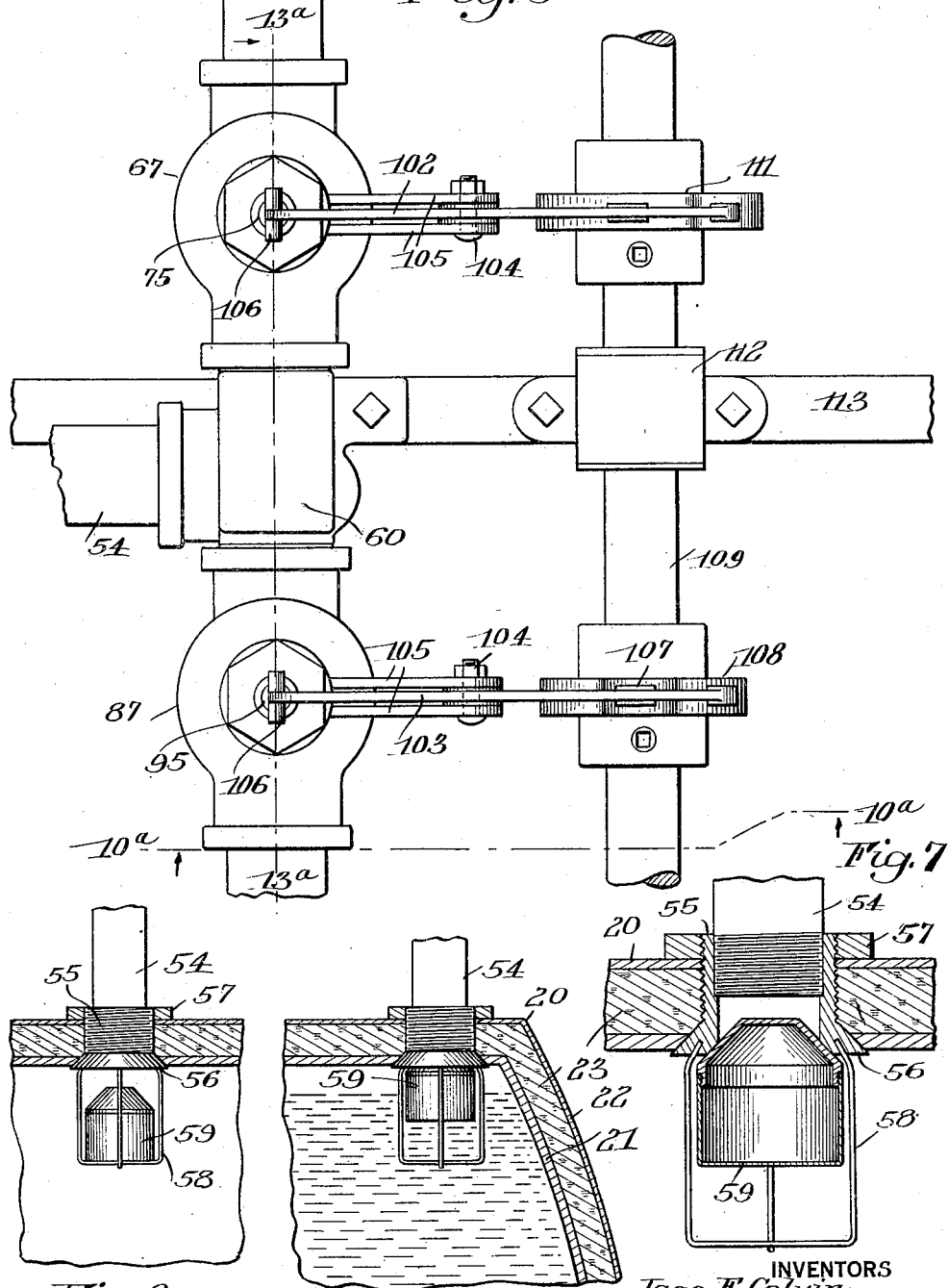
INVENTORS
Isac E. Colvin
Grant N. Manison
Hugo G. Walters
their ATTORNEYS March 3, 1931. I. E. COLVIN ET AL 1,794,670
PROCESSING APPARATUS
Filed March 17, 1926 6 Sheets-Sheet 5

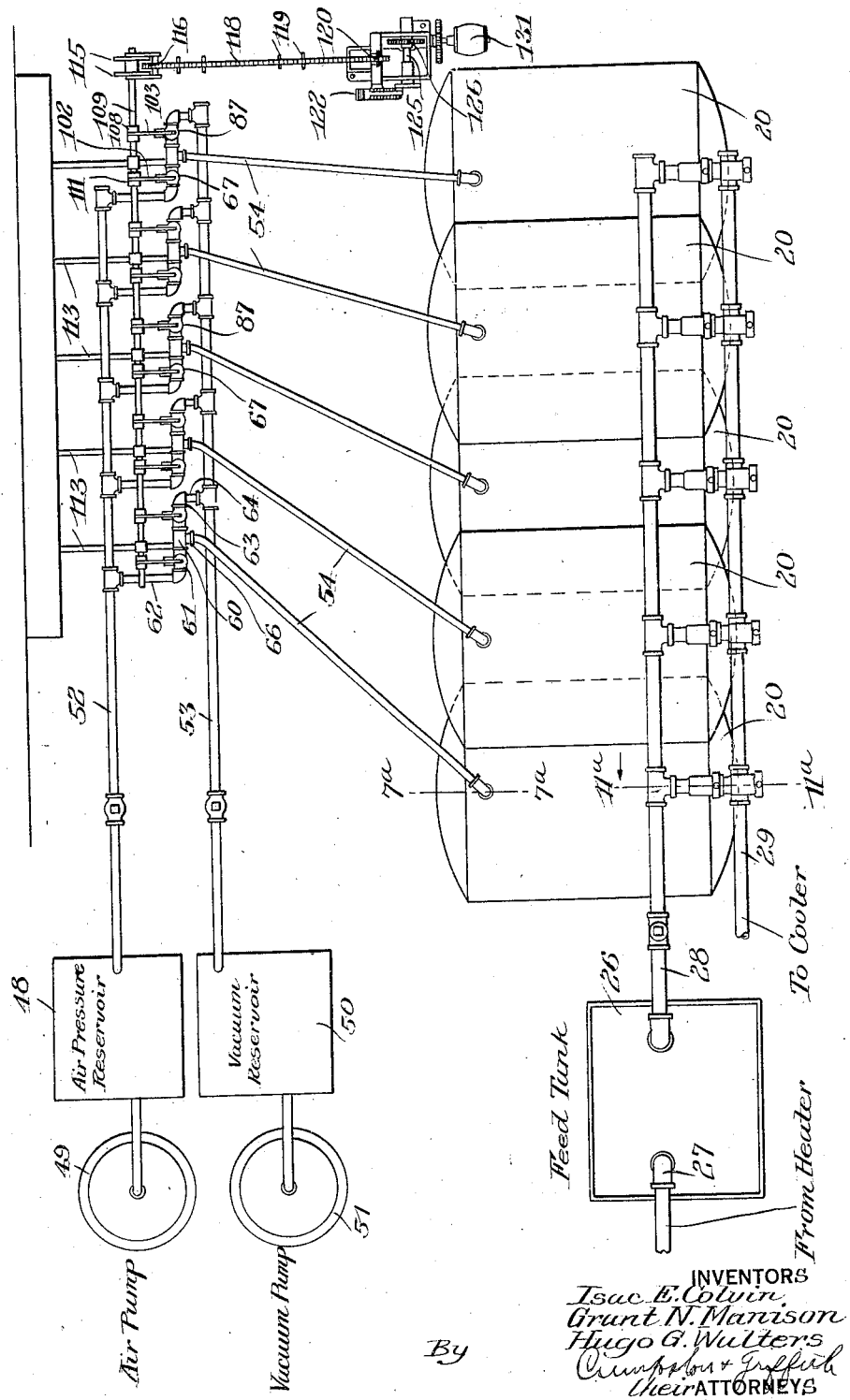

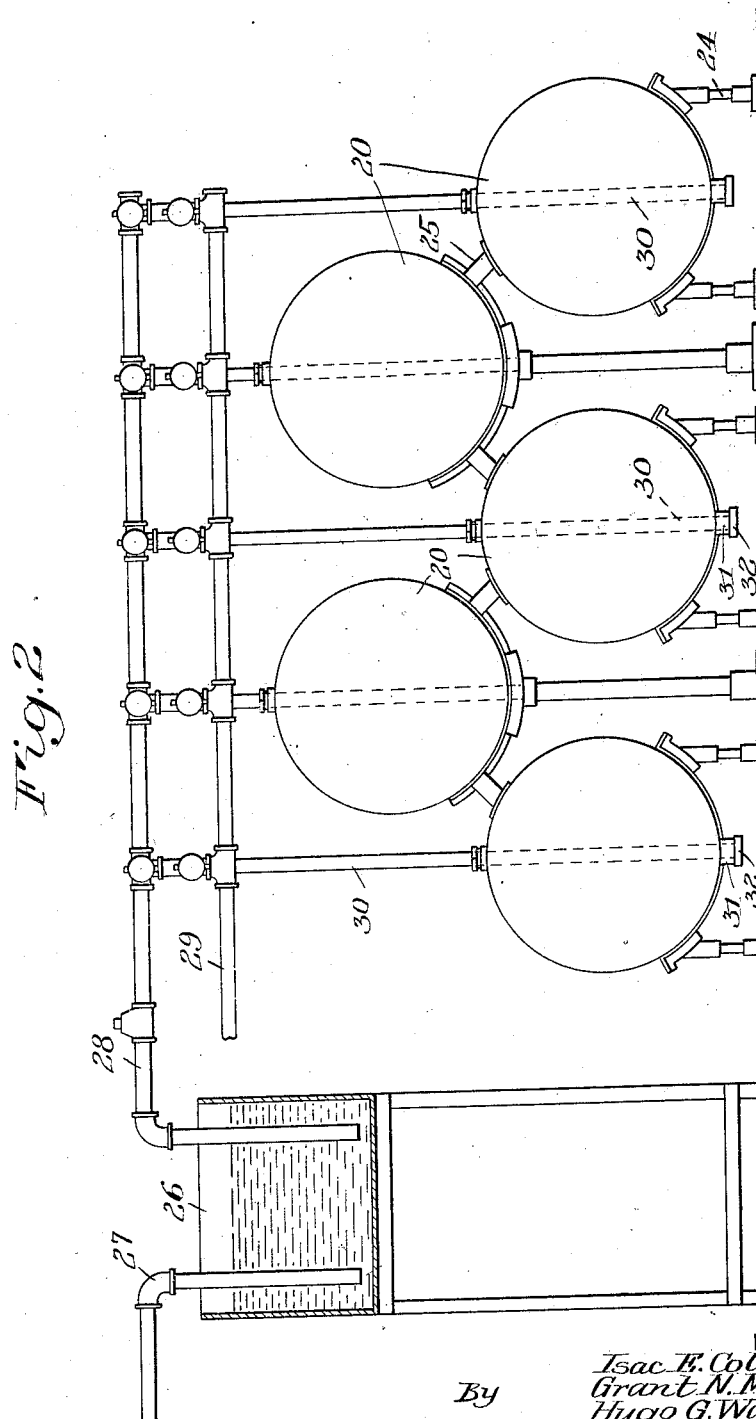

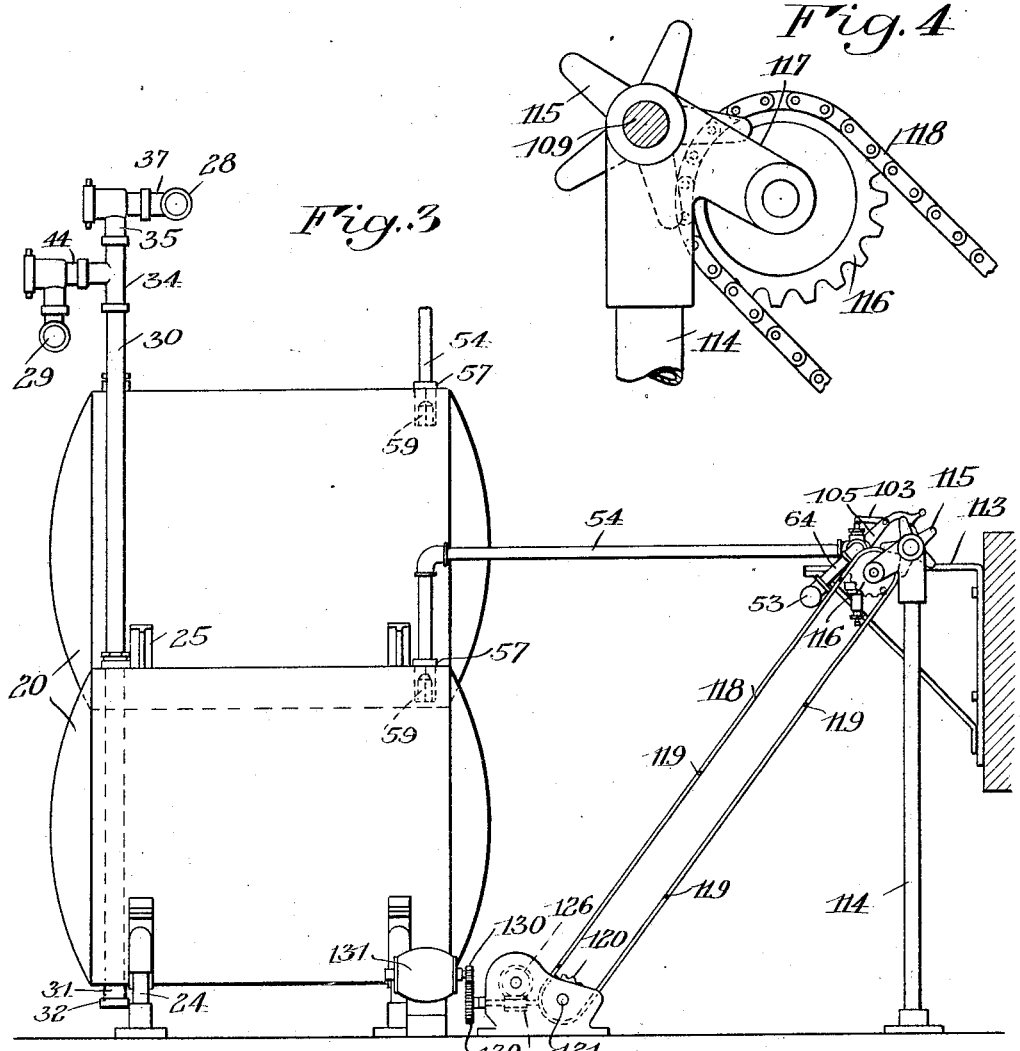

INVENTORS
Isaac E. Colvin
Grant N. Manison
BY Hugo G. Walters
their ATTORNEYS

March 3, 1931.  I. E. COLVIN ET AL  1,794,670
PROCESSING APPARATUS
Filed March 17, 1926   6 Sheets-Sheet 6

INVENTORS
Isac E. Colvin
Grant N. Manison
Hugo G. Walters
By Crumpston & Griffith
their ATTORNEYS Patented Mar. 3, 1931

1,794,670

UNITED STATES PATENT OFFICE

ISAAC E. COLVIN, OF CHICAGO, ILLINOIS, AND GRANT N. MANISON AND HUGO G. WALTERS, OF ROCHESTER, NEW YORK, ASSIGNORS TO THE PFAUDLER COMPANY, OF ROCHESTER, NEW YORK, A CORPORATION OF NEW YORK

PROCESSING APPARATUS

Application filed March 17, 1926. Serial No. 95,454.

This invention relates to processing apparatus of a variety adapted, for example, for pasteurizing milk, one object of the invention being to provide an improved apparatus of this character having a simple and practical form of construction and capable of being efficiently employed for treating a batch of milk or other fluid to be processed in a complete and expeditious manner.

Another object is the provision of apparatus of this nature capable of operation by variations of pressure, as, for example, by the use of pressures above and below that of the atmosphere, for effecting in a simple and practical manner the supply and discharge of the fluid to be treated to and from the processing container.

Another object is to provide apparatus of the class described adapted for operation by variations of pressure including the use of a partial vacuum to which the milk or other fluid to be treated is subjected in the processing container, whereby the application of the partial vacuum serves to remove from the milk various objectionable odors, gases and the like to improve its quality.

Another object is the provision of such an apparatus constructed to supply the milk to the processing container adjacent the bottom of the latter to prevent objectionable foaming and in which the milk after treatment is discharged at a point below the bottom of the container to insure complete emptying of the latter, the parts being so constructed and arranged as to obviate any admixture of untreated with treated fluid.

A further object is to provide apparatus, such as described, of an automatic character capable of operating in an efficient and reliable manner to insure complete pasteurization of all portions of a batch of milk for the required length of time and the rapid supply and discharge of the same to and from the treating container.

Still a further object is the provision of apparatus having the above advantages capable of automatically treating a substantially continuous supply of milk while at the same time subjecting all portions of such supply to complete pasteurizing treatment for the necessary period.

To these and other ends the invention resides in certain improvements and combinations of parts, all as will be hereinafter more fully described, the novel features being pointed out in the claims at the end of the specification.

In the drawings:

Figure 1 is a top plan view of an apparatus embodying the present invention;

Figure 2 is an elevation of one side thereof;

Figure 3 is an end elevation of the same;

Figure 4 is an enlarged detail of a portion of the cam shaft drive;

Figure 5 is an enlarged elevation of the speed reduction gearing for driving the cam shaft;

Figure 6 is an enlarged top plan view of the air valves for one container and the means for actuating the same;

Figure 7 is an enlarged central sectional view of a float valve for each container;

Figures 8 and 9 are side elevations of the same with the container wall in section, showing the valve in different operating positions;

Similar reference numerals throughout the several views indicate the same parts.

Figure 10:
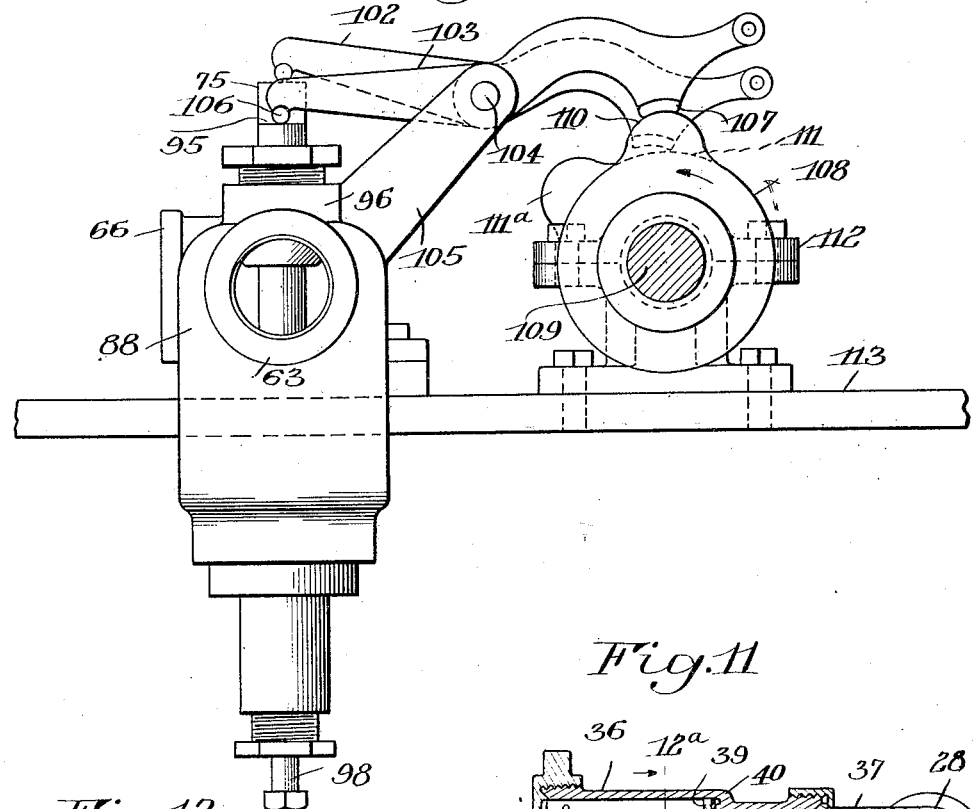
Figure 10 is an enlarged end view of the air valve and cam shaft and showing the connections therebetween.

The invention is disclosed herein, by way of illustration, in an embodiment particularly adapted for use as a pasteurizing apparatus or, more specifically, an apparatus for holding milk for the requisite period after it has been heated to the pasteurizing temperature, for completing pasteurization. The present apparatus comprises a plurality of insulated containers with means for filling and emptying the same in succession, one after another, to handle a supply of the milk to be treated in a substantially continuous manner.

Referring more particularly to the drawings, and first to Figures 1, 2 and 3 thereof, the holding containers, of which in the present instance there are five, are shown at 20. These containers are preferably in the form of steel tanks, having a sanitary, vitreous lining for the inner surface of the inner wall 21 thereof, Figure 9. Spaced from the inner wall of the container is an outer jacket wall 22 and the space between these walls is filled with any suitable insulated material 23, as well understood in the art. The containers are arranged in the present instance, as shown in Figure 2, with three of them disposed horizontally side by side and close together and supported on the floor by legs 24. The remaining containers are supported on and above the intervals of the lower row, as by means of legs 25 resting on the lower containers. This provides a compact, banked arrangement of the containers occupying a minimum of floor space and, while five such containers are shown in the present instance, it will be apparent that a greater or less number of them may be employed.

The milk supply source is represented by a feed tank 26 at atmospheric pressure and supplied with milk adjacent its bottom through a supply pipe 27. Dipping into this milk supply is a header pipe 28 extending above one end of the bank of containers. Parallel with this supply line 28 is a discharge means or header pipe 29. Pipes 28 and 29 are connected by means including check valves, as hereafter described, with a vertical conducting means or pipe 30 for each of the containers to alternately supply milk from the header 28 to each container through the pipe 30 and to discharge the milk from the containers through the same pipe 30 to the discharge line 29.

Figure 14:
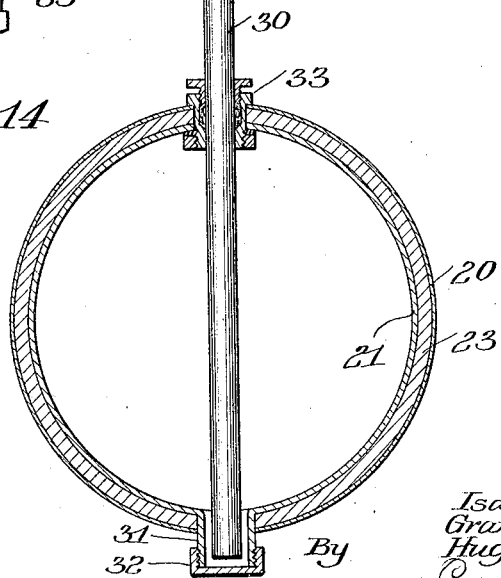
Figure 14 is an enlarged transverse sectional view through one of the containers showing the milk conducting means therefor.

The milk conducting means 30 for each container or tank preferably connects with the latter at a point below the bottom of the tank, for the purpose of supplying milk at the bottom of the tank to avoid the objectionable foaming which occurs when the milk is supplied to the tank at its top, and also for the purpose of completely draining the tank during discharge. To this end each tank, at the front end of its bottom, is provided below the latter with a well, Figure 14, into which the milk conducting means or pipe 30 dips. Such a well is formed, in the present instance, by extending a flange 31 from the inner wall of the tank, as shown, through the jacket to a substantial distance below the bottom of the tank, this well being closed at its lower end as by means of a cap 32. Milk conductor 30 is extended through a stuffing in the upper side of the tank of any suitable construction as indicated generally at 33, Figure 14. The lower end of the conductor dips into the well 31 adjacent its bottom, as shown, so that the milk is thus supplied to the tank at its very bottom and also so that the tank can be completely drained during discharge.

Figure 12:
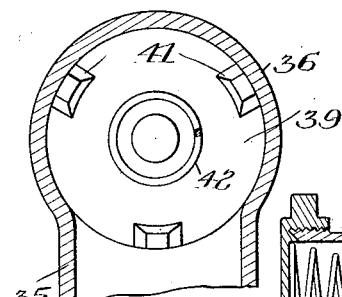
Figure 12 is an enlarged sectional view on the line 12a—12a in Figure 11.
Figure 11:
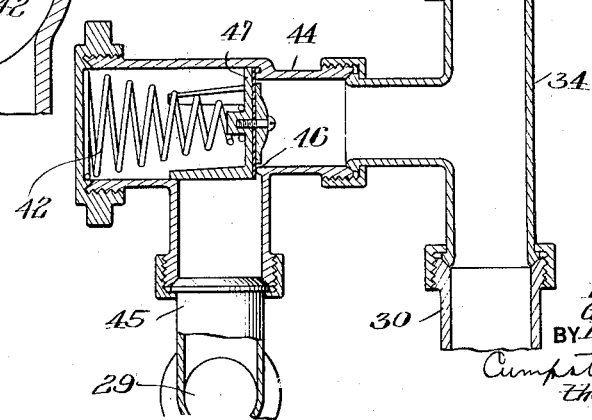
Figure 11 is an enlarged central sectional elevation of check valve means for the milk supply line.

Milk pipe 30 is connected at its upper end with the supply and discharge lines 28 and 29 by a form of connection best shown in Figures 11 and 12, comprising preferably a T fitting 34, one branch of which is connected with the pipe 30. The opposite branch of the fitting is connected with one branch of a check valve fitting 35 in the general form of an elbow having a spring housing extension 36. The other branch of fitting 35 is connected by means of a T 37 with the supply line 28. Fitting 35 is formed with a seat 38 with which cooperates a disk valve 39 equipped with a packing washer 40 for engagement with seat 38 to afford a fluid tight closure. Valve 39 carries a plurality of guiding lugs 41 slidably engaging the inner surface of spring housing 36 to guide the valve toward and from its seat. A coiled spring 42 in the housing has one end engaged with the valve and the other with the end of the housing. The tension of this spring and therefore the pressure at which the valve operates is adjusted by adjusting a cap 43 threadedly engaged on and forming the end of the housing. It will be apparent from this description that the production of a pressure in conductor 30 and fitting 34 substantially less than that in the supply line 28 serves to open the check valve and to draw milk from the header 28 and supply tank 26 into conductor 30 and into the corresponding container, as hereafter described.

The remaining branch of the T fitting 34 is connected with one branch of an elbow 44, the other branch of which connects with a T fitting 45 and thereby with the discharge line 29. Fitting 44 also comprises a check valve and is similar in construction to the check valve fitting 35 described above, so that the description of the latter applies also to the construction of fitting 44. The latter thus includes a seat 46 with which cooperates a spring-actuated valve 47 which, however, is seated and closed by a reduction of pressure in milk conductor 30 and fitting 34 below that of the pressure on the discharge line 29. An increase of the pressure in conductor 30 and fitting 34, however, serves to move valve 37, against the tension of the spring, to open position for discharging the milk from conductor 30. At the same time such increase in pressure permits and assists valve 39 to close and thus shut off communication with the milk supply.

The milk supply source in the present instance is at atmospheric pressure, as also the discharge line 29, and it will be apparent from the above description that a substantial reduction in pressure, or partial vacuum, in the container serves to connect the latter with the milk supply line and close communication with the discharge line 29, while a substantial increase in pressure in the container above that of the atmosphere reverses the position of both valves, closes communication with the supply and opens communication with the discharge so that the supply lines 28 and 29 may be automatically connected, one at a time, with the container by variations in pressure in the latter above and below that of the atmosphere.

The filling and emptying of the containers is thus accomplished by the alternate production in each container of a partial vacuum and a pressure above that of the atmosphere, to first draw milk into the container and then, after it has been held for the desired period, to discharge the same therefrom. To this end there is provided a source of air pressure represented, in the present instance, by a tank 48, Figure 1, of suitable capacity in which an appropriate pressure above that of the atmosphere is maintained in any suitable manner as by means of an automatic air pump indicated generally at 49, as well understood in the art. There is provided also a region of reduced pressure or partial vacuum in the form of a container 50 of suitable capacity which is exhausted by an automatic vacuum pump represented generally at 51, as well understood in the art. From these reservoirs 48 and 50, respectively, extend pressure and vacuum headers or air pipes 52 and 53 and means are provided for alternately and automatically connecting these headers one at a time with the holding containers 20 through air pipes 54, as hereafter described.

The line or pipe 54 for controlling the pressure in each container, to fill and empty the same, preferably connects with the container at its top and adjacent the end thereof opposite the milk connections. Pipe 54 in the present instance is thus threaded into a nipple 55 having a head 56 seated in an opening in the main wall of the container. The nipple extends through the insulating jacket and a lock nut 57 draws the nipple into fluid tight contact with its seat in the tank wall. Fixed to the head 56 of the nipple in the container is a wire cage 58 in which slides vertically a float valve body 59 having a conical upper end cooperating with a conical seat at the inner end of the bore of the nipple, to close the latter in the elevated position of the valve. It is apparent from this construction that when a sub-atmospheric pressure is produced in pipe 54 to draw the milk into and fill the container, the milk will raise the float valve 59, when the tank is approximately filled, into contact with its seat on nipple 56 and thus close pipe 54, assisted by the effect of the lower pressure in the latter. The valve opens automatically when the pressure in pipe 54 is raised above that of the atmosphere but closes the pipe to stop the filling operation when the tank is approximately filled and to prevent any milk from entering the line 54. Figures 8 and 9 show valve 59 in its open and closed positions.

Figure 13:
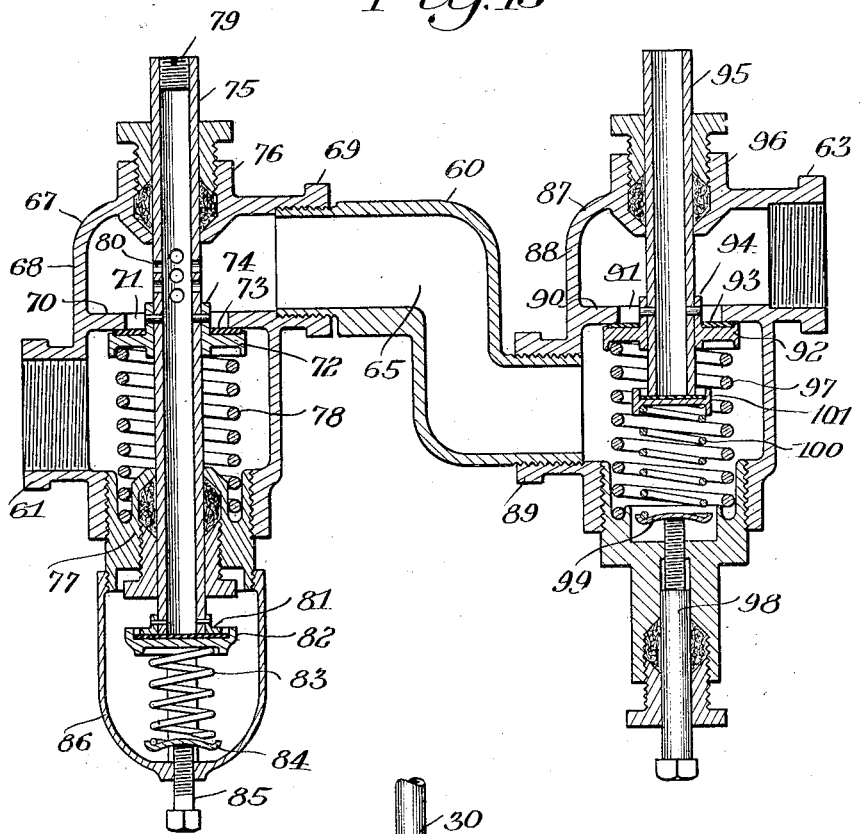
Figure 13 is an enlarged central sectional elevation through a pair of air valves for each container.

Pipe 54 is connected with the pressure and vacuum lines 54 and 53, respectively, by means comprising a pair of valves operated automatically in accordance with a predetermined time schedule. To this end, the pressure and vacuum lines 52 and 53 are connected with the opposite ends of a double valve assembly for each container or tank, as best shown in Figures 1 and 13. The valve assembly is indicated generally at 60, having a branch or pipe flange 61 connected by means of a pipe 62 with the air pressure line 52. A second branch or connection flange 63 is connected by means of a pipe 64 with the reduced pressure or partial vacuum line 53. The valve assembly has a central portion 65 with which the corresponding container pipe 54 communicates at the connection flange 66, Figure 10. A valve is thus interposed between the container and each of the pressure and vacuum lines 52 and 53 for thereby controlling the connecting means leading from each tank to the air pressure and vacuum reservoirs 48 and 50.

The valve controlling the connection of the container with the air pressure reservoir 48 is best shown in Figure 13 where it is indicated generally at 67 at the left hand side of the figure. This valve comprises a body portion 68 having the pipe connection 61 previously described and at the opposite side a pipe connection 69 for the central portion 65 of the valve assembly. At 70 is a partition having a central opening or valve passage 71, the circumference of which forms the valve seat. At 72 is the valve body in the general form of a disk having a packing washer 73 cooperating with the seat. This valve body is in the present instance in the form of a disk carried by a hub 74 pinned on a tubular stem 75. The latter slides longitudinally in a packing gland 76 at one end and in a similar gland 77 at the other end of the body 68. A coiled compression spring 78 about the stem between the valve and the end of the body 68 urges the stem longitudinally upward and the valve toward its seat to shut off communication with the source of compressed air. The upper end of the valve stem is closed as at 79. The interior of the stem, however, is in communication with the central portion 65 of the assembly through suitable ports such as the plurality of openings 80, as shown. The stem projects below the bottom of the body 68 and this end is open and provided with a flange 81 forming a valve seat. Pressed toward this seat is a valve body 82 of general disk shape carried on the upper end of a compression spring 83 the lower end of which is mounted on a plate 84 carried on the upper end of an adjusting set screw 85. The latter is threadedly supported in the bottom of an open cage 86 attached at its upper end to the bottom of the valve body 68. Means are provided, as hereafter described for intermittently engaging the upper end of stem 75 to depress the same against spring 78 and thus to open the valve and admit air pressure to the container. The pressure of the stem and valve compresses spring 83 so that at such time valve 83 maintains the lower end of the stem closed. When the stem 75 is released, however, it is moved upwardly by spring 78 to close the main valve and shut off the air pressure from the central portion 65 of the assembly. At this time, however, the tension of spring 83 is relieved in the upper position of stem 75, so that the pressure remaining in the container and in the central portion 65 of the assembly, passing through ports 80 in the stem, forces valve 82 from its seat sufficiently to relieve the pressure in the container and bring the same back substantially to atmospheric pressure. This is for the purpose of relieving the pressure in the container preparatory to the subsequent production of a reduced pressure in the same.

The valve controlling the communication between the container and the source of reduced pressure is shown at the right in Figure 13 and indicated generally at 87. This valve comprises a body portion 88 having the pipe connection flange 63 previously described for connection with the source of reduced pressure and, at its opposite side, the pipe flange 89 connected with the central portion 65 of the assembly. Between these flanges is the partition 90 formed with an opening or valve passage 91, the circumference of which serves as the valve seat. Cooperating with the latter is a disk-like valve 92 suitably packed at 93 and mounted on a hub 94 pinned on a stem 95 which projects through a packing gland 96 in the top of the body, as shown, and is open to the atmosphere at its upper end. Coiled about the stem is a compression spring 97 engaging at its upper end with valve 92 to seat the same and at its lower end with the bottom portion of the valve body 88. The latter carries an adjustable set screw 98 supporting at its upper end a disk 99 supporting one end of an inner compression spring 100, the upper end of which carries a valve 101 seated against the open lower end of stem 95. Means are provided as hereafter described for engagement with the upper end of stem 95 to open the valve against the action of spring 97 to connect the container with the vacuum reservoir 50 to exhaust the container. While stem 95 is depressed for this purpose, spring 100 is tensioned to maintain valve 101 against the lower end of the stem to close the latter. When stem 95 is released, however, it is raised by spring 97 to close the main valve and disconnect the container from the vacuum reservoir. In such position the tension of spring 100 is relieved and atmospheric pressure, entering through the end of the bore of the stem 95, unseats valve 101 and relieves the partial vacuum in the container, preparatory to the subsequent production of a pressure therein above that of the atmosphere.

It is thus apparent that the air valves 67 and 87 may be operated to alternately connect the container with a region of reduced pressure to draw the milk into and fill the container and subsequently, after the holding period, with a source of compressed air for discharging the milk from the container. Also, that these valves are provided with means acting after each valve has been operated and closed, for automatically restoring the container to substantially atmospheric pressure.

The air valves 67 and 87 for each container described above are operated automatically in accordance with a predetermined time schedule, by a common cam shaft as hereafter described. The connections from the cams of said shaft to the valve stems 75 and 95 are preferably in the form of pivoted levers 102 and 103, respectively, one end of each of which bears against a cam on the cam shaft while the other ends of the levers engage the upper ends of the respective air valve stems 75 and 95, Figure 10. These levers being substantially the same in construction and arrangement, it will suffice to describe the lever 103 which is pivoted intermediate its ends at 104 on a bracket 105 projecting from the valve casing 88. One end of the lever carries a transverse cylindrical contact bar 106 for engagement with the upper end of valve stem 95, without, however, closing the upper end of the latter. The other end of the lever is provided with a contact surface 107 bearing on a cam 108 fixed on the cam shaft 109. The cam is formed with a raised portion 110 adapted to rock the lever 103 to depress the valve stem, the parts being returned by the action of the spring 97 when the high portion 110 of the cam passes out of contact with the lever. Lever 102 is provided with a similar cam 111 fixed on the cam shaft 109 and having a high portion 111a. The cams 108 and 111 are so formed and positioned on the shaft as to first depress valve stem 95 to connect the container with the partial vacuum reservoir 50 for a sufficient period to fill the container with a batch of milk drawn from the reservoir 26 through the corresponding check valve in the conducting means 30.

As the fluid rises in the container, float valve 59 is raised, when the container has been filled, closing pipe 54, after which time the cam shaft 109 moves cam 108 to release valve stem 95 and disconnect the container from the vacuum reservoir. As the valve closes, its auxiliary valve 101 is automatically unseated to admit atmospheric pressure through the hollow valve stem to restore the container to substantially atmospheric pressure. Shaft 109 is revolved by means hereafter described and after a predetermined holding period, lever 102 is rocked by the high portion 111a of cam 111 to depress valve stem 75 and connect the container with the air reservoir 48 to force the contents of the container through conductor 30 to the discharge line 29. After a sufficient period to completely empty the container, cam portion 111a releases lever 102 which releases valve stem 75 to permit the valve to close, ready for a repetition of the operation. As the valve closes the container is connected with the atmosphere by the unseating of auxiliary valve 82 so that the container is restored to substantially atmospheric pressure ready for the subsequent connection with the exhausting means. Valve operating means are provided for each of the containers and being the same for each, the above description applies to such means for each container. The containers are operated in succession, one after another, so that some one of them is always being filled and another discharged, and the operation of the apparatus as a whole is adapted to receive and discharge a substantially continuous supply of milk. To this end the cams on shaft 109 for the different containers are spaced or stepped about the shaft to bring the containers into operation in the desired sequence or coordination.

Cam shaft 109 is supported in bearings 112 on suitable frame work comprising, for example, the bracket means 113 which also supports the air valves 67 and 87, as well as a standard 114 at one end of the shaft. The means for driving the shaft comprises, preferably, a motor driven, speed reduction gearing which in turn drives a sprocket chain for intermittently imparting to the shaft a step by step or partial rotation. To this end, the shaft has fixed thereon at its outer end a pair of spaced star wheels 115. At one side and intermediate these star wheels is a sprocket wheel 116, Figures 3 and 4, carried by brackets 117 on standard 114. The sprocket chain is shown at 118 passing over the sprocket wheel and is provided with spaced lugs 119 extending laterally therefrom. As each of the chain lugs 119 passes the star wheels 115 it turns the star wheels and cam shaft a portion of one revolution adapted to produce proper movement of the cams. Chain 118 passes at its lower end about a sprocket wheel 120 on a shaft 121 which has fixed thereon a ratchet wheel 122. A pawl 123 is actuated by a crank arm 124 on a shaft 125 carrying a worm wheel 126. Engaging the latter is a worm 127 on a shaft 128 which carries also a spur gear 129 with which meshes a pinion 130 on the shaft of the motor 131. By this means chain 118 is given a slow movement so that its spaced lugs produce the desired intermittent turning of the cam shaft.

The operation of the apparatus has been explained above in connection with the description of its construction from which it will be understood that a continuous supply of fluid to be treated, such as milk, is fed to tank 26. The pressure tank 48 and the vacuum tank 50 are supplied with air and exhausted, respectively, by suitable pump means. The driving motor 131, through the action of the speed reduction gearing, effects a slow turning of the cam shaft on which the cams are so arranged as to operate the air valves in proper sequence for filling and emptying the tanks in succession, one after another. That is, each tank or container is first connected with the vacuum reservoir 50 by which it is exhausted to draw in a supply of milk through line 28, check valve 36 and conductor 30. As the container is filled, its float valve 59 closes the line 54 to the air valves and the vacuum valve is then allowed by its cam to close. As this valve closes it automatically breaks the vacuum in the container. This filling action may require a period of, say, 10 minutes, after which the milk is allowed to stand in each container for the desired holding period, of, say, 30 minutes, at the end of which time the cam opens the valve 67 establishing communication between the container and air pressure reservoir 48, so that the pressure drives the milk through the conductor 30, check valve 47 and discharge line 29, thus completely emptying the container. At this time, the valve to the source of pressure is permitted to close and automatically releases the pressure in the container above that of the atmosphere, preparatory to repetition of the cycle. While the milk is being held in one tank, the next is being filled and so on, the tanks or containers being operated in succession so that all of the containers are operating all of the time and the apparatus as a whole operates at maximum capacity. The use of alternating pressures in the container below that of the pressure on the supply inlet and above that on the discharge outlet serves in an effective and sanitary manner to accomplish the movement of the milk from place to place, while the use of the vacuum for drawing the milk into the containers is particularly advantageous in that it serves also to withdraw from the milk various objectionable odors, gases, etc., to thus improve the quality of the product. The check valve mechanism for the milk conducting means and the connection of the latter with each container below its bottom serves to maintain the complete separation of the raw and treated fluids so that the raw fluid cannot contaminate that which has already been treated. The introduction and withdrawal of the fluid at the bottom of the container prevents the foaming which might occur, were the milk introduced at the upper portion of the container and also provides for complete emptying of the same. It is to be noted that the air valves for producing the different pressures for filling and emptying the containers are positively actuated, so that the chance of failure is eliminated and at all events that failure in operation of one of these valves would merely stop the operation of the corresponding container without interrupting the operating of the other containers. Furthermore, the alternating pressures in the containers assist the operation of the spring-actuated check valves in the milk lines so that the chance of failure of these is also practically eliminated and should one of the checking valves for any reason fail to operate properly that also would merely stop the operation of the corresponding container without waste of any milk or contamination of pasteurized milk by raw fluid. The invention thus affords a simple, practical and fully automatic apparatus capable of handling the milk or other fluid in a reliable sanitary and continuous manner.

We claim as our invention:

1. A processing apparatus comprising a fluid container, conducting means for connecting said container with a source of supply of fluid to be treated and with discharge means, means for connecting said container alternately with a source of pressure greater than that on said discharge means and with a region of pressure less than that on the fluid supply for alternately filling said container with said fluid and discharging the same therefrom, a plurality of separate valves for controlling said connecting means, a common shaft provided with devices for operating said valves and mechanism for rotating said shaft in accordance with a predetermined time schedule.

2. A processing apparatus comprising a fluid container, conducting means for connecting said container with a source of supply of fluid to be treated and with discharge means, means for connecting said container alternately with a source of pressure greater than that on said discharge means and with a region at a pressure less than that on said fluid supply, a pair of valves controlling said connecting means, a shaft having a cam for operating each of said valves, and mechanism for rotating said shaft in accordance with a predetermined time schedule.

3. A processing apparatus comprising a fluid container having an inlet adapted for connection with a source of supply of fluid to be treated and having also an outlet, means for connecting said container alternately with a region at a pressure greater than that on said outlet and with a region at a pressure less than that on said fluid supply, a plurality of separate valves for controlling said connecting means to vary the pressure in said container to fill and empty the same, each of said valves being provided with a device operating automatically upon closure of the valve to restore said container to normal pressure, and mechanism for operating said valves automatically in accordance with a predetermined time schedule.

4. A processing apparatus comprising a fluid container, a source of supply of fluid to be treated, conducting means communicating with said container and with said fluid supply and also with a discharge means, automatic check valves arranged to check flow from said conducting means toward said fluid supply and from said discharge means toward said conducting means, means for connecting said container alternately with a source of pressure greater than that on said discharge means and with a region at a pressure less than that on said fluid supply, a plurality of separate valves controlling said connecting means to vary the pressure in said container to fill and empty the same, each of said valves being provided with a device operating automatically upon closure of the valve to restore the pressure in said container to normal, and mechanism for operating the valves of said connecting means automatically in accordance with a predetermined time schedule.

5. A processing apparatus comprising a source of supply of fluid to be treated, a fluid container having an inlet connected with said fluid supply and having also an outlet, check valves controlling said container inlet and outlet, means for connecting said container alternately with a region of air pressure less than the pressure on said fluid supply and with a source of air pressure greater than that on said container outlet, for producing variations of pressure in said container to draw said fluid thereto and discharge the same therefrom, a valve operated by the fluid in said container when the latter is filled to close said connecting means, air valves controlling said connecting means, and mechanism for operating said air valves automatically in accordance with a predetermined time schedule.

6. A pasteurizing apparatus comprising a source of supply of milk to be treated at atmospheric pressure, an insulated fluid container having an inlet connected with said fluid supply and having also an outlet, check valves controlling said container inlet and outlet, means for connecting said container alternately with a region of pressure less than that of the atmosphere and with a source of air pressure greater than that of the atmosphere, air valves controlling said connecting means for varying the pressure in said container to draw the milk thereinto and discharge the same therefrom, a valve operated by the milk in said container when the latter is filled for closing said connecting means, and mechanism for operating said air valves automatically in accordance with a predetermined time schedule.

7. A processing apparatus comprising a source of supply of fluid to be treated, a plurality of fluid containers, a discharge means, conducting means for connecting each of said containers adjacent the bottom thereof with said fluid source and with said discharge means, automatic check valves for said conducting means tending to check flow therefrom toward said fluid supply and flow thereto from said discharge means, means for connecting each of said containers alternately with a source of pressure greater than that on said discharge means and with a region of pressure less than that on said fluid supply source, separate valves for controlling said connecting means for each of said containers, and mechanism for operating the valves of each container to alternately fill and empty the same and for operating the valves of said plurality of containers in succession to effect a substantially continuous treatment of fluid from said supply source.

8. A pasteurizing apparatus comprising a source of supply of milk to be treated at atmospheric pressure, a plurality of insulated fluid containers, a discharge means, conducting means for connecting each of said containers adjacent the bottom thereof with said milk source and with said discharge means, automatic check valves controlling said conducting means to prevent flow from the latter toward said milk supply and toward said conducting means from said discharge means, means for connecting each of said containers alternately with a source of air pressure greater than that of the atmosphere and with a region of pressure less than that of the atmosphere, float valve means in each container for closing said connecting means when the container is filled, air valves for controlling said connecting means and a shaft provided with cams for operating said valves to alternately fill and empty each of said containers one after another in accordance with a predetermined time schedule.

9. A processing apparatus comprising a source of supply of fluid to be treated, a plurality of fluid containers, a discharge means, conducting means for connecting each of said containers with said fluid source and with said discharge means, automatic check valves for said conducting means tending to check flow therefrom toward said fluid supply and flow thereinto from said discharge means, a source of pressure greater than that on said discharge means, a region of pressure less than that on said fluid supply source, a set of valves, one associated with each container, for connecting each container to said source of pressure, a second set of valves, one associated with each container, for connecting each container to said region of pressure, and means for operating the valves associated with each container to fill and empty each container alternately.

10. A processing apparatus comprising a source of supply of fluid to be treated, a plurality of fluid containers, a discharge means, conducting means for connecting each of said containers with said fluid source and with said discharge means, automatic check valves for said conducting means tending to check flow therefrom toward said fluid supply and flow thereinto from said discharge means, a source of pressure greater than that on said discharge means, a region of pressure less than that on said fluid supply source, a set of valves, one associated with each container, for connecting each container to said source of pressure, a second set of valves, one associated with each container, for connecting each container to said region of pressure, means for operating the valves associated with each container to fill and empty each container alternately, and float valve means in each container for automatically closing the connection between said container and said region of pressure when the fluid within said container reaches a predetermined point.

11. A processing apparatus comprising a source of supply of fluid to be treated, a plurality of fluid containers, a discharge means, conducting means for connecting each of said containers with said fluid source and with said discharge means, automatic check valves for said conducting means tending to check flow therefrom toward said fluid supply, and flow thereinto from said discharge means, a source of pressure greater than that on said discharge means, a region of pressure less than that on said fluid supply source, a set of valves, one associated with each container, for connecting each container to said source of pressure, a second set of valves, one associated with each container, for connecting each container to said region of pressure, a shaft, means on said shaft for operating said valves in predetermined relationship, and mechanism for driving said shaft.

12. A processing apparatus comprising a source of supply of fluid to be treated, a plurality of fluid containers, a discharge means, conducting means for connecting each of said containers with said fluid source and with said discharge means, automatic check valves for said conducting means tending to check flow therefrom toward said fluid supply and flow thereinto from said discharge means, a source of pressure greater than that on said discharge means, a region of pressure less than that on said fluid supply source, a set of valves, one associated with each container, for connecting each container to said source of pressure, a second set of valves, one associated with each container, for connecting each container to said region of pressure, a cam shaft, a plurality of cams on said shaft, one associated with each of said valves, for operating the latter according to a predetermined schedule, and mechanism for driving said cam shaft.

13. A processing apparatus comprising a source of supply of fluid to be treated, a plurality of fluid containers, a discharge means, conducting means for connecting each of said containers with said fluid source and with said discharge means, automatic check valves for said conducting means tending to check flow therefrom toward said fluid supply and flow thereinto from said discharge means, a source of pressure greater than that on said discharge means, a region of pressure less than that on said fluid supply source, a set of valves, one associated with each container, for connecting each container to said source of pressure, a second set of valves, one associated with each container, for connecting each container to said region of pressure, a shaft, means on said shaft for operating said valves in predetermined relationship, a star wheel on said shaft, an endless member movable adjacent said star wheel and having means thereon for producing a partial rotation of the star wheel, and mechanism for driving said endless member.

14. A processing apparatus comprising a source of fluid supply to be treated, a fluid container having a connection with said fluid supply, a region of pressure less than the pressure on said fluid supply, means for connecting said region of pressure to said container, said means including a valve, a second valve for venting said container to the atmosphere, and resilient means acting to keep said second valve tightly closed when said first valve is open and permitting said second valve to open under slight differences in pressure when said first valve is closed.

15. A processing apparatus comprising a fluid container having an outlet, a source of pressure greater than that on said container outlet, means for connecting said container to said source of pressure to drive the fluid within the container through said outlet, said means including a valve, a second valve for venting said container to the atmosphere, and resilient means acting to keep said second valve tightly closed when said first valve is open, and permitting said second valve to open under slight differences in pressure when said first valve is closed.

16. A processing apparatus comprising a source of supply of fluid to be treated, a plurality of fluid containers, discharge means, conducting means for connecting each of said containers with said fluid source and with said discharge means, automatic check valves for said conducting means tending to check flow therefrom toward said fluid supply and flow thereto from said discharge means, a source of pressure greater than that on said discharge means, a region of pressure less than that on said fluid supply source, a set of valves, one associated with each container, for connecting each container to said source of pressure, a second set of valves, one associated with each container, for connecting each container to said region of pressure, and a venting check valve associated with each valve of each set, each of said venting check valves having means for keeping said check valve closed when the valve with which it is associated is open, and permitting said check valve to open under slight differences in pressure when the valve with which it is associated is closed.

ISAAC E. COLVIN.
GRANT N. MANISON.
HUGO G. WALTERS.